United States Patent
An et al.

(10) Patent No.: US 11,623,426 B2
(45) Date of Patent: Apr. 11, 2023

(54) INTERIOR MATERIAL OF VEHICLE

(71) Applicants: HYUNDAI MOTOR COMPANY, Seoul (KR); KIA MOTORS CORPORATION, Seoul (KR); KOLONGLOTECH. Inc., Seoul (KR)

(72) Inventors: Jae Hyun An, Seosan-si (KR); In Soo Han, Uiwang-si (KR); Ik Jin Jung, Ansan-si (KR); Kyu Rok Kim, Suwon-si (KR); Seung Sik Han, Hwaseong-si (KR); Dae Seok Choi, Gumi-si (KR); Chang Jae Lee, Daegu (KR); In Sub Hwang, Daegu (KR)

(73) Assignees: HYUNDAI MOTOR COMPANY, Seoul (KR); KIA MOTORS CORPORATION, Seoul (KR); KOLONGLOTECH. Inc., Seoul (KR)

( * ) Notice: Subject to any disclaimer, the term of this patent is extended or adjusted under 35 U.S.C. 154(b) by 283 days.

(21) Appl. No.: 16/925,640

(22) Filed: Jul. 10, 2020

(65) Prior Publication Data
US 2021/0114339 A1    Apr. 22, 2021

(30) Foreign Application Priority Data
Oct. 18, 2019    (KR) .................. 10-2019-0130129

(51) Int. Cl.
*B32B 3/24*    (2006.01)
*B32B 5/02*    (2006.01)
(Continued)

(52) U.S. Cl.
CPC ............... *B32B 5/08* (2013.01); *B32B 3/266* (2013.01); *B32B 5/024* (2013.01); *B32B 5/026* (2013.01);
(Continued)

(58) Field of Classification Search
None
See application file for complete search history.

(56) References Cited

U.S. PATENT DOCUMENTS 3,028,279 A * 4/1962 Georg ................ D03D 15/00
                                                    442/221
3,948,702 A * 4/1976 Theissen ............... B32B 5/08
                                                    156/247
(Continued)

FOREIGN PATENT DOCUMENTS

CN    203077721 U *  7/2013
CN    103541138 A *  1/2014
(Continued)

OTHER PUBLICATIONS

Machine Translation of KR-2016064568-A, Jun. 2016 (Year: 2016).*
Machine Translation of CN-203077721-U, Jul. 2013 (Year: 2013).*

*Primary Examiner* — Jeffrey A Vonch
(74) *Attorney, Agent, or Firm* — Lempia Summerfield Katz LLC

(57) ABSTRACT

An interior material of a vehicle includes: a fabric layer made of a tricoat fabric, a foam layer disposed on a lower surface of the fabric layer, and an antifouling layer disposed at least between an upper surface of the fabric layer or the fabric layer and the foam layer. The tricoat fabric includes a combination of at least one of a polyurethane yarn, a high-elongation polyester yarn, or a polyester yarn.

15 Claims, 2 Drawing Sheets

(51) Int. Cl.

| | |
|---|---|
| *B32B 5/04* | (2006.01) |
| *B32B 5/08* | (2006.01) |
| *B32B 5/18* | (2006.01) |
| *B32B 5/24* | (2006.01) |
| *B32B 7/12* | (2006.01) |
| *B32B 27/02* | (2006.01) |
| *B32B 27/06* | (2006.01) |
| *B32B 27/12* | (2006.01) |
| *B32B 27/28* | (2006.01) |
| *B32B 27/32* | (2006.01) |
| *B32B 27/36* | (2006.01) |
| *B32B 27/40* | (2006.01) |
| *B32B 33/00* | (2006.01) |
| *B60R 13/02* | (2006.01) |
| *B60R 21/2165* | (2011.01) |
| *D06N 3/00* | (2006.01) |
| *D06N 3/04* | (2006.01) |
| *D06N 3/12* | (2006.01) |
| *D06N 3/14* | (2006.01) |
| *D06N 3/18* | (2006.01) |
| *D04B 21/16* | (2006.01) |
| *D04B 21/18* | (2006.01) |
| *B32B 3/26* | (2006.01) |
| *B32B 37/12* | (2006.01) |
| *D04B 1/18* | (2006.01) |
| *D03D 15/56* | (2021.01) |
| *D03D 15/573* | (2021.01) |
| *D04B 1/16* | (2006.01) |
| *D03D 17/00* | (2006.01) |
| *D03D 15/283* | (2021.01) |

(52) U.S. Cl.
CPC ............... *B32B 5/04* (2013.01); *B32B 5/18* (2013.01); *B32B 5/245* (2013.01); *B32B 7/12* (2013.01); *B32B 27/02* (2013.01); *B32B 27/065* (2013.01); *B32B 27/12* (2013.01); *B32B 27/40* (2013.01); *B32B 33/00* (2013.01); *B60R 13/02* (2013.01); *B60R 21/2165* (2013.01); *D04B 21/16* (2013.01); *D04B 21/18* (2013.01); *D06N 3/0006* (2013.01); *D06N 3/0009* (2013.01); *D06N 3/0013* (2013.01); *D06N 3/0027* (2013.01); *D06N 3/0036* (2013.01); *D06N 3/047* (2013.01); *D06N 3/128* (2013.01); *D06N 3/14* (2013.01); *D06N 3/145* (2013.01); *D06N 3/186* (2013.01); *B32B 27/283* (2013.01); *B32B 27/322* (2013.01); *B32B 27/36* (2013.01); *B32B 2037/1215* (2013.01); *B32B 2255/02* (2013.01); *B32B 2255/26* (2013.01); *B32B 2262/0215* (2013.01); *B32B 2262/0276* (2013.01); *B32B 2262/0292* (2013.01); *B32B 2262/12* (2013.01); *B32B 2262/148* (2021.05); *B32B 2262/152* (2021.05); *B32B 2266/0278* (2013.01); *B32B 2307/51* (2013.01); *B32B 2307/54* (2013.01); *B32B 2307/73* (2013.01); *B32B 2307/732* (2013.01); *B32B 2307/754* (2013.01); *B32B 2327/12* (2013.01); *B32B 2327/18* (2013.01); *B32B 2367/00* (2013.01); *B32B 2375/00* (2013.01); *B32B 2383/00* (2013.01); *B32B 2605/003* (2013.01); *B32B 2605/08* (2013.01); *B60R 13/0256* (2013.01); *B60R 13/0262* (2013.01); *B60R 13/0275* (2013.01); *D03D 15/283* (2021.01); *D03D 15/56* (2021.01); *D03D 15/573* (2021.01); *D03D 17/00* (2013.01); *D04B 1/16* (2013.01); *D04B 1/18* (2013.01); *D06N 3/0043* (2013.01); *D06N 2203/044* (2013.01); *D06N 2203/061* (2013.01); *D06N 2203/066* (2013.01); *D06N 2203/068* (2013.01); *D06N 2209/142* (2013.01); *D06N 2209/145* (2013.01); *D06N 2209/146* (2013.01); *D06N 2209/147* (2013.01); *D06N 2209/1635* (2013.01); *D06N 2209/1685* (2013.01); *D06N 2211/261* (2013.01); *D06N 2211/263* (2013.01); *D10B 2331/04* (2013.01); *D10B 2331/10* (2013.01); *D10B 2401/061* (2013.01); *D10B 2401/063* (2013.01); *D10B 2505/08* (2013.01); *D10B 2505/12* (2013.01); *Y10T 428/15* (2015.01); *Y10T 428/24273* (2015.01); *Y10T 428/24322* (2015.01); *Y10T 428/31* (2015.01); *Y10T 442/218* (2015.04); *Y10T 442/2164* (2015.04); *Y10T 442/2172* (2015.04); *Y10T 442/2189* (2015.04); *Y10T 442/2279* (2015.04); *Y10T 442/2287* (2015.04); *Y10T 442/2746* (2015.04); *Y10T 442/2861* (2015.04); *Y10T 442/3008* (2015.04); *Y10T 442/3016* (2015.04); *Y10T 442/3024* (2015.04); *Y10T 442/3285* (2015.04); *Y10T 442/3317* (2015.04); *Y10T 442/3325* (2015.04); *Y10T 442/3854* (2015.04); *Y10T 442/413* (2015.04); *Y10T 442/469* (2015.04)

(56) References Cited

U.S. PATENT DOCUMENTS

| | | | | |
|---|---|---|---|---|
| 4,298,643 | A * | 11/1981 | Miyagawa | B32B 5/024 264/257 |
| 4,393,116 | A * | 7/1983 | Taylor | B29C 70/86 264/319 |
| 4,861,535 | A * | 8/1989 | Due | D02G 1/165 264/234 |
| 5,174,936 | A * | 12/1992 | Due | D02G 1/165 264/285 |
| 5,456,976 | A * | 10/1995 | LaMarca, II | B29C 45/14811 428/317.1 |
| 5,815,868 | A * | 10/1998 | Lee | D06C 27/00 8/151.2 |
| 5,837,622 | A * | 11/1998 | Hamilton | D03D 15/56 442/213 |
| 6,207,250 | B1 * | 3/2001 | Bullock | D06M 15/277 428/137 |
| 6,263,707 | B1 * | 7/2001 | Miller | D04B 1/18 66/172 E |
| 6,453,535 | B1 * | 9/2002 | Nicholas | B29C 59/007 29/428 |
| 6,896,310 | B1 * | 5/2005 | Trappe | B60R 21/2165 296/70 |
| 2002/0153710 | A1 * | 10/2002 | Gray | B60R 21/2165 280/728.3 |
| 2002/0166348 | A1 * | 11/2002 | Yoon | D04B 21/00 66/196 |
| 2003/0051512 | A1 * | 3/2003 | Pierelli | D04B 21/12 66/195 |
| 2004/0076823 | A1 * | 4/2004 | Yoshimura | D01F 6/92 428/373 |
| 2004/0137814 | A1 * | 7/2004 | Kimbrell, Jr. | D06M 15/657 442/93 |
| 2004/0164531 | A1 * | 8/2004 | Riha | B29C 59/16 280/732 |
| 2005/0022313 | A1 * | 2/2005 | Scheidler | C14C 9/00 8/115.51 |
| 2005/0062010 | A1 * | 3/2005 | Fang | D06M 15/277 252/8.62 |
| 2005/0132509 | A1 * | 6/2005 | Chuang | D04B 1/18 8/444 |

(56) References Cited

U.S. PATENT DOCUMENTS

| | | | |
|---|---|---|---|
| 2006/0010929 A1* | 1/2006 | Chuang | D04B 1/18 66/171 |
| 2006/0030229 A1* | 2/2006 | Fukuoka | D04B 1/16 66/202 |
| 2006/0039889 A1* | 2/2006 | Lafaysse | C09D 183/06 424/78.09 |
| 2006/0177620 A1* | 8/2006 | Gray | B60K 37/00 428/57 |
| 2006/0207296 A1* | 9/2006 | Fujikawa | D04B 21/18 66/202 |
| 2006/0228964 A1* | 10/2006 | Watkins | D06L 4/20 427/430.1 |
| 2007/0020447 A1* | 1/2007 | Yamaguchi | G10K 11/168 428/304.4 |
| 2009/0026740 A1* | 1/2009 | Dorn | B60R 21/216 16/385 |
| 2010/0093243 A1* | 4/2010 | Uemura | B32B 5/026 442/304 |
| 2011/0247370 A1* | 10/2011 | Akao | D04B 21/16 66/196 |
| 2012/0094564 A1* | 4/2012 | Yun | D06M 15/277 8/115.6 |
| 2012/0223512 A1* | 9/2012 | Barr | B60R 21/2165 280/743.1 |
| 2013/0035011 A1* | 2/2013 | Jung | D06N 3/14 427/412 |
| 2014/0021703 A1* | 1/2014 | Scharf | B32B 7/00 156/245 |
| 2014/0230118 A1* | 8/2014 | Koizumi | D04B 27/34 28/165 |
| 2015/0020546 A1* | 1/2015 | Zhang | D04B 21/18 28/155 |
| 2015/0111451 A1* | 4/2015 | Date | D03D 15/47 442/184 |
| 2015/0130169 A1* | 5/2015 | Fujita | B60R 21/2165 280/728.3 |
| 2015/0251620 A1* | 9/2015 | Son | B60R 21/04 280/728.1 |
| 2015/0354101 A1* | 12/2015 | Liao | D02G 3/328 428/377 |
| 2016/0207283 A1* | 7/2016 | Wang | B32B 3/085 |
| 2017/0266937 A1* | 9/2017 | Feng | B32B 27/36 |
| 2018/0057999 A1* | 3/2018 | Hayashi | D06M 13/288 |
| 2019/0135199 A1* | 5/2019 | Galan Garcia | B60K 35/00 |
| 2019/0242039 A1* | 8/2019 | Cheng | D04B 21/14 |
| 2019/0309452 A1* | 10/2019 | Liao | D04B 1/123 |
| 2020/0141052 A1* | 5/2020 | Wanibuchi | D06N 3/183 |
| 2021/0372015 A1* | 12/2021 | Keum | D03D 15/587 |

FOREIGN PATENT DOCUMENTS

| | | | |
|---|---|---|---|
| CN | 105671776 A * | 6/2016 | D04B 21/00 |
| CN | 105671990 A * | 6/2016 | |
| CN | 106120129 A * | 11/2016 | |
| CN | 106183134 A * | 12/2016 | |
| CN | 106283701 A * | 1/2017 | |
| CN | 106637618 A * | 5/2017 | |
| CN | 109228550 A * | 1/2019 | B32B 37/06 |
| DE | 102007057739 A1 * | 6/2009 | B60N 2/58 |
| DE | 102015107741 A1 * | 11/2015 | B60R 13/0212 |
| EP | 1281798 A2 * | 2/2003 | D04B 21/12 |
| JP | 55128041 A * | 10/1980 | |
| JP | 57117673 A * | 7/1982 | |
| JP | 58013751 A * | 1/1983 | |
| JP | 58049237 A * | 8/1983 | |
| JP | 58180624 A * | 10/1983 | |
| JP | 60252747 A * | 12/1985 | |
| JP | 61138756 A * | 6/1986 | B60R 13/02 |
| JP | 61168633 A * | 7/1986 | B60R 13/02 |
| JP | 62117848 A * | 5/1987 | |
| JP | 63028955 A * | 2/1988 | D03D 15/0005 |
| JP | 01250432 A * | 10/1989 | D03D 15/0005 |
| JP | 02080648 A * | 3/1990 | B60R 13/02 |
| JP | 02160905 A * | 6/1990 | |
| JP | 02251627 A * | 10/1990 | |
| JP | 04185748 A * | 7/1992 | |
| JP | 05339855 A * | 12/1993 | |
| JP | 06031871 A * | 2/1994 | |
| JP | 07117571 A * | 5/1995 | |
| JP | 07300749 A * | 11/1995 | |
| JP | 08134753 A * | 5/1996 | |
| JP | 08218257 A * | 8/1996 | |
| JP | 09111671 A * | 4/1997 | |
| JP | 09296344 A * | 11/1997 | |
| JP | 09323597 A * | 12/1997 | |
| JP | 2000211047 A * | 8/2000 | |
| JP | 2000220065 A * | 8/2000 | |
| JP | 2000314063 A * | 11/2000 | |
| JP | 2001159052 A * | 6/2001 | |
| JP | 2002069805 A * | 3/2002 | |
| JP | 2003183956 A * | 7/2003 | |
| JP | 2005059434 A * | 3/2005 | |
| JP | 2011012364 A * | 1/2011 | |
| JP | 2011168905 A * | 9/2011 | |
| JP | 2011246836 A * | 12/2011 | |
| JP | 2012207352 A * | 10/2012 | |
| JP | 2013082264 A * | 5/2013 | |
| JP | 2015223890 A * | 12/2015 | B60R 13/0212 |
| KR | 2002035195 A * | 5/2002 | D04B 1/16 |
| KR | 2004099493 A * | 12/2004 | D04B 21/14 |
| KR | 2005033910 A * | 4/2005 | |
| KR | 10-2008-0088306 A1 | 10/2008 | |
| KR | 2011009529 A * | 1/2011 | B60R 21/207 |
| KR | 2011056876 A * | 5/2011 | |
| KR | 2015055404 A * | 5/2015 | |
| KR | 2016064568 A * | 6/2016 | D04B 1/18 |
| KR | 1923129 B1 * | 2/2019 | D04B 21/14 |

* cited by examiner

INTERIOR MATERIAL OF VEHICLE

CROSS REFERENCE TO RELATED APPLICATION

The present application claims priority to Korean Patent Application No. 10-2019-0130129, filed Oct. 18, 2019, the entire contents of which are incorporated herein by reference.

FIELD

The present disclosure relates to an interior material of a vehicle.

BACKGROUND

The statements in this section merely provide background information related to the present disclosure and may not constitute prior art.

An interior component of a vehicle, referred to as a crash pad, is attached to a lower end of a windshield, and is manufactured such that an instrument panel including various instruments such as a speedometer or a fuel gauge, an audio system, a navigation system and the like may be attached thereto. Especially, a skin layer is formed to express various patterns on a urethane foam layer that absorbs shock and has shock absorbing effect for the sake of safety. The conventional crash pad is a product that is surface-treated by spraying on the urethane foam layer.

However, this has difficulties in expressing various surface patterns and creating a luxurious interior atmosphere as well as good tactility.

Recently, the crash pad is being developed in the form of wrapping natural leather to create good tactility and luxurious vehicle interior atmosphere. An example of the natural leather material includes cowhide. The cowhide can create the luxurious interior atmosphere, but has disadvantages in that it may have a great material property difference depending on the age or region of a cow, and it may be undesirably creased, shrunk, and deformed according to a management method. In addition, since all the cowhide is imported and expensive, the cowhide is applied to only luxury cars. Thus, there is a limit to applying the cowhide to various car models.

Moreover, recently, in order to create a warmer feeling in the vehicle, the fabric is applied to the crash pad, an armrest, and a door inner trim.

We have discovered that since the vehicle interior material using the fabric is vulnerable to contamination, high elongation is desired to apply the interior material to a core in a wrapping form.

SUMMARY

The present disclosure provides a fabric layer using a high-elongation tricoat fabric.

The present disclosure also provides an antifouling layer using silicone resin so as to realize a vehicle interior material having excellent antifouling performance.

In another form, the present disclosure provides an interior material of a vehicle, which provides a tear hole at a position corresponding to a tear line of an airbag door disposed on a crash pad, thus making it easy to deploy an airbag door.

Objects of the present disclosure are not limited to the above-mentioned objects, and other objects of the present disclosure that are not mentioned may be more clearly understood by the following description of forms of the present disclosure.

In order to achieve the objects of the present disclosure, the present disclosure provides an interior material of a vehicle constructed as follows.

The present disclosure provides an interior material of a vehicle, the interior material including: a fabric layer forming the interior material of the vehicle; a foam layer disposed on a lower surface of the fabric layer; and a first antifouling layer disposed on an upper surface of the fabric layer. In particular, the fabric layer may include: a combination of at least one of polyurethane yarn, high-elongation polyester yarn, or polyester yarn.

In one form, the fabric layer may be made of a combination of woven fabric or knitted fabric.

In another form, the fabric layer of the knitted fabric may be made of tricoat fabric.

In some forms of the present disclosure, the tricoat fabric may be formed by sequentially weaving the polyurethane yarn, the high-elongation polyester yarn, and the polyester yarn.

In some forms of the present disclosure, the first antifouling layer may include a combination of at least one of a silicone antifouling layer, a fluorine-carbide-based antifouling layer or a thermoplastic polyurethane resin (TPU) film.

In some forms of the present disclosure, the interior material may further include a tear hole disposed along a tear line on the fabric layer.

In some forms of the present disclosure, the tear line may be formed at a position corresponding to a deployment position where an airbag door may be deployed.

In some forms of the present disclosure, the fabric layer may contain 20 to 30 wt % of the polyurethane yarn.

In some forms of the present disclosure, the fabric layer may contain 50 to 60 wt % of the high-elongation polyester yarn.

In other form, the fabric layer may contain 20 to 25 wt % of the polyester yarn.

In some forms of the present disclosure, the fabric layer may be formed to have elongation of 150% or more.

In some forms of the present disclosure, the interior material may further include a second antifouling layer disposed between the fabric layer and the foam layer.

In some forms of the present disclosure, the second antifouling layer may include at least one of an adhesive layer, a thermoplastic polyurethane resin (TPU) film, or a hot-melt adhesive between the fabric layer and the foam layer.

In one form, the second antifouling layer may include at least one of a hot-melt adhesive or a thermoplastic polyurethane resin (TPU) film.

The present disclosure can achieve the following effects through the configuration, coupling, and use of the above and other forms.

The present disclosure provides an interior material of a vehicle, which has a high-elongation tricoat fabric to be applicable to interior components having many curved parts.

Furthermore, the present disclosure provides an interior material of a vehicle, which provides high antifouling effect to a fabric layer, thus making it easy to manage the interior material.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
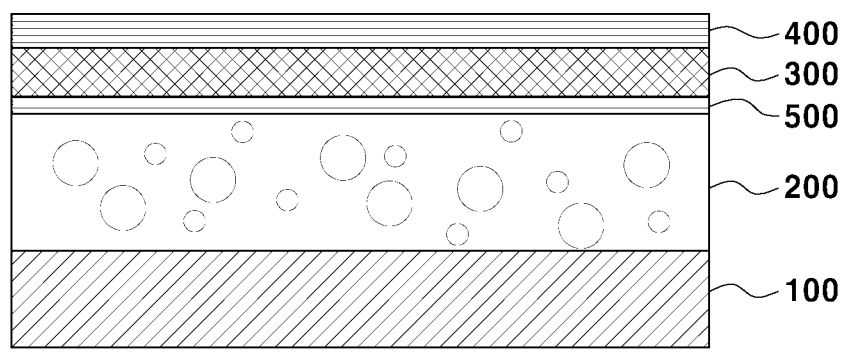
FIG. 1 illustrates the section of each of layers forming an interior material of a vehicle, according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, forms of the present disclosure will be described in detail with reference to the accompanying drawings. The forms of the present disclosure may be changed in various ways, and the scope of the present disclosure should not be construed as being limited to the following forms. The forms are merely provided to more fully describe the present disclosure.

Furthermore, terms described herein, such as "layer" or "fabric", mean a unit for performing at least one function or operation, which may be implemented by hardware or a combination of hardware.

The present disclosure is directed to an interior material of a vehicle including a fabric layer 300. In one form, the present disclosure discloses an interior material of a vehicle, which is configured to have high elongation while improving antifouling performance.

FIG. 1 is a side sectional view of an interior material of a vehicle, according to one form of the present disclosure.

The interior material of the vehicle may be configured to have a three-layered structure including: a core layer 100 that is composed of a hard core formed of a plastic material, a fabric layer 300 that is formed of either of a woven fabric or a knitted fabric and a combination of the woven fabric and the knitted fabric, and a foam layer 200 that is formed between the fabric layer 300 and the core layer 100 by foam forming using a foaming liquid such as polyurethane.

The foam layer 200 may be formed to be stacked on the upper surface of the core layer 100 through a foam process. The foam layer is configured to inhibit or prevent sagging caused by the load of the fabric layer 300 stacked on the upper surface of the foam layer 200 and heat-resistant sagging caused by high temperature.

The fabric layer 300 may be configured to face the interior of the vehicle, and may be formed of a woven fabric or a knitted fabric whose elongation is 150% or more. In one form of the present disclosure, the fabric layer 300 is made of a high-elongation tricoat fabric. In another form, the high-elongation tricoat fabric may be made of a combination of at least one of polyurethane yarn, high-elongation polyester yarn or polyester yarn.

In other form, the tricoat fabric may be composed of 20 to 30 wt % of polyurethane yarn, 50 to 60 wt % of high-elongation polyester yarn, and 20 to 25 wt % of polyester yarn.

In one form of the present disclosure, the tricoat fabric applied to the fabric layer 300 is made by sequentially weaving the polyurethane yarn, the high-elongation polyester yarn, and the polyester yarn. The tricoat fabric is made to have an elongation of 30 to 35% compared to an original fabric. The tricoat fabric woven in this manner has relatively higher elongation compared to a configuration where general polyester yarn has an elongation of 15 to 20% from the length of original yarn.

The high-elongation tricoat fabric is processed to longitudinally have overfeed twice as high as the general yarn when yarn is processed, so that the tricoat fabric has relatively higher elongation than the general yarn.

The high-elongation tricoat fabric configured as described is made to have tensile elongation of 150% or more as compared with the conventional tricoat fabric. In one form, the high-elongation tricoat fabric is made to have vertical elongation of 170% or horizontal elongation of 160%.

In another form, the high-elongation tricoat fabric forming the fabric layer 300 undergoes a thermal contraction process to realize the high elongation and thereby increase the tensile elongation of the tricoat fabric.

The thermal contraction process is a processing method of stabilizing in the manner of a hot-air dryer after performing a thermal contraction process of a dyeing machine, and performs the thermal contraction process at least once.

The thermal contraction process of the dyeing machine means a processing method that performs the thermal contraction by immersing the tricoat fabric in hot water of 85° C. for 15 minutes, thus increasing the tensile elongation.

By performing the processing method, the high-elongation tricoat fabric forming the fabric layer 300 is made to have the vertical elongation of 170% or the horizontal elongation of 160% as compared to the general tricoat fabric, as described above.

The fabric layer 300 made to have the above-mentioned elongation may be attached to the interior material having many curved parts, as in the crash pad.

An adhesive layer is provided between the foam layer 200 and the fabric layer 300 to attach respective layers. In one form, the adhesive layer attaches the foam layer 200 and the fabric layer 300 using a bond lamination method or a primer attaching method.

In another form, the adhesive layer interposed between the foam layer 200 and the fabric layer 300 may be configured to form a second antifouling layer 500. At least one antifouling film may be formed through a thermoplastic polyurethane resin (TPU) film, a hot-melt adhesive, and a combination thereof.

The second antifouling layer 500 may be made by stacking the TPU film on the foam layer 200 or through a hot-melt attaching method where thermoplastic resin is applied to the foam layer 200 at high temperature and then is hot-melt attached to the fabric layer 300. Thereby, it is possible to form at least one layer.

The first antifouling layer 400 may be configured to form at least one layer on the upper surface of the fabric layer 300. In one form, the first antifouling layer 400 may be at least one layer or be formed by stacking at least one of a silicone antifouling layer, a fluoro-carbon-based antifouling layer, or a TPU film.

In some forms of the present disclosure, the first antifouling layer 400 may be placed on the upper surface of the fabric layer 300, and be configured to include a transparent TPU film stacked on the upper surface of the fabric layer 300, a silicone antifouling layer and a fluoro-carbon-based antifouling layer that may be stacked on the transparent TPU film, respectively.

As one antifouling layer forming the first antifouling layer 400, a silicone antifouling layer is formed using a silicone coating solution that contains silicone resin or liquid silicone. Since silicone used for the first antifouling layer 400 can have excellent water repellency and provide slip properties to a surface, it is possible to improve the antifouling performance on a surface of the fabric layer 300.

In one form of the present disclosure, modified silicone may be produced by grafting various organic groups onto the methyl group of dimethyl polysiloxane, and may contain 89 to 99 wt % solids.

The silicone resin or liquid silicone forming the first antifouling layer 400 may use any type of silicone, as long as it may provide softness and antifouling performance to the tricoat fabric and improve wear performance.

If the silicone coating solution forming the first antifouling layer 400 is too small, the antifouling effect may be deteriorated. By contrast, if the silicone coating solution is 160 g/m$^2$ or more, it may lead to a poor appearance and an increase in cost. Hence, the silicone coating solution is in the range of about 140 to 170 g/m$^2$.

In one form, the first antifouling layer 400 may be in a multi-layered structure to further include a fluorine-carbide-based antifouling layer, in addition to the silicone resin.

That is, the fluoro-carbon-based antifouling layer forming the first antifouling layer 400 may form a layer containing fluorine-carbide-based resin, and may include a silicone antifouling layer placed on the upper surface of the fluorine-carbide-based resin.

The first antifouling layer 400 including the fluorine-carbide-based antifouling layer is based on three types including Poly tetra Fluoro Ethylene (PTFE), Fluorinated Ethylene Propylene (FEP), and PerFluoro Alkoxy (PFA). A coating layer using the layer has the following characteristics.

First, Poly Tetra Fluoro Ethylene (PTFE) coating is formed in one or two-coat manner. Among fluorine-carbide-based resins as a basic substance, the PTFE coating material, which has the highest service temperature, namely, 290° C., an extremely low frictional coefficient, excellent wear resistance, chemical resistance and non-tackiness, and forms a porous film, is usually an aqueous product.

Fluorinated Ethylene Propylene copolymer (FEP) coating is changed into a substance having fluidity in a sintering process to form a non-porous film. Such a FEP coating has excellent chemical resistance and corrosion resistance, a very low frictional coefficient, and excellent non-tackiness. The maximum service temperature of the FEP coating is 205° C., and the FEP coating is supplied in the form of an aqueous product or powder.

The Per Fluoro Alkoxy (PFA) coating forms a non-porous film such as FEP. The PFA has advantages in that its continuous service limit temperature is high, namely, 260° C., and its film thickness is increased to 1000 μm or more, and it has more excellent durability than PTFE or FEP. Due to these features, the PFA has a wide range of uses, and is often used in an area especially requiring the chemical resistance. The PFA product is supplied in an aqueous or powder form.

In addition, coating using Ethylene Tetra Fluoro Ethylene (ETFE) that is marketed under the trade name of "TEFZEL" and is a copolymer of Ethylene and Tetra Fluoro Ethylene may be used. Although the ETFE is not completely fluorinated, it has excellent chemical resistance, its continuous service temperature is 150° C. to provide the highest strength among the fluorine-carbide-based resins, its thickness is increased up to 2500 μm, and its durability is excellent. The ETFE is supplied in a powder form.

The above-listed fluoro-carbon-based antifouling layers have non-tackiness by which most substances hardly adhere thereto, water repellency and oil repellency by which each layer is hardly stained with water or oil, heat resistance by which substances are hardly decomposed even at high temperature (up to about 260° C.), low-temperature durability by which the properties of the substance are not changed even at low temperature, and properties by which substances are hardly affected by the surrounding chemical environment.

As described above, the first antifouling layer 400 of the present disclosure is the fluoro-carbon-based antifouling layer, and may form a layer of at least one of Poly tetra Fluoro Ethylene (PTFE), Fluorinated Ethylene Propylene (FEP), and PerFluoro Alkoxy (PFA) as the fluorine-carbide-based resin.

The fluoro-carbon-based antifouling layer may be configured to pass through a water bath for the fabric layer 300 and then impregnate the fabric layer 300. In one form, the fluoro-carbon-based antifouling layer may be configured to impregnate the fabric layer 300 and then form a layer.

However, in the case of the first antifouling layer 400 composed of only the fluorine-carbide-based resin coating layer, contaminants may penetrate between fluorine molecules to contaminate the fabric layer 300. Thus, according to one form of the present disclosure, a layer made of silicone resin may be further stacked to form the first antifouling layer 400, or a multiple first antifouling layer 400 having the fluoro-carbon-based antifouling layer and the silicone antifouling layer may be formed.

According to another form of the present disclosure, the second antifouling layer 500 may be formed between the fabric layer 300 and the foam layer 200. According to a further form, the first antifouling layer 400 placed on the fabric layer and the second antifouling layer 500 having different physical properties may be selectively formed.

An exemplary form of the present disclosure provides the interior material of the vehicle, in which the fabric layer 300 made of the tricoat fabric among the knitted fabric is provided, and which includes the foam layer 200 disposed on the lower surface of the fabric layer 300, the first antifouling layer 400 disposed on the upper surface of the fabric layer 300 to form at least one layer, and the second antifouling layer 500 interposed between the fabric layer 300 and the foam layer 200.

In the form of the present disclosure, a configuration for tearing the interior material such as an airbag door is included, and a tear hole (needle hole) is formed in the interior material of the vehicle along the tear line of the airbag door to maintain deploying performance.

The tear hole is formed through a needle punch. According to one form of the present disclosure, a needle punching process is performed to form 800 to 900 punches per square centimeter. Moreover, the needle for forming the tear hole may have the length of 3.5 inches.

The tear hole is formed along the tear line in an area of the interior material where deployment is desired. In the form of the present disclosure, the tear hole may be formed at a position substantially corresponding to a deployment position of a two-door type airbag door.

When comparing the tear line along which the tear hole is formed with another area having no tear hole, the former is configured to be reduced by 40 to 60% in burst strength, tensile strength, and tear strength. Thus, this is configured to have physical properties shown in the following table.

TABLE 1

|  | Needle punch | Burst strength (Kgf) | Tensile strength (Kgf/50 mm) | | Tear strength (Kgf) | | Tensile elongation (Kgf) | |
| --- | --- | --- | --- | --- | --- | --- | --- | --- |
|  |  |  | Vertical | Horizontal | Vertical | Horizontal | Vertical | Horizontal |
| High-elongation fabric before performing needle punch | 0 | 11 | 47 | 71 | 3.2 | 2.4 | 170 | 160 |
| High-elongation fabric at position where needle punch is performed | 800-900PPSC | 5 | 30 | 42 | 1.5 | 1 | 165 | 152 |
| Change rate |  | 45% | 64% | 59% | 47% | 42% | 97% | 95% |

As shown in the above table, the tear hole is formed at a position corresponding to the tear line of the vehicle material of the vehicle by performing the needle punching process. This is configured such that its tensile strength has the reduction rate (change rate) of 64% in a vertical direction and 59% in a horizontal direction, and its tear strength has the reduction rate (change rate) of 47% in the vertical direction and 42% in the horizontal direction.

Furthermore, it is possible to provide the high-elongation tricoat fabric including the tear hole, the tensile elongation of which has the change rate of 97% in the vertical direction and 95% in the horizontal direction.

As in the airbag door, the interior material of the vehicle is configured to have the tear hole at a position where deployment is desired, thus providing the airbag deploying performance.

Figure 2:
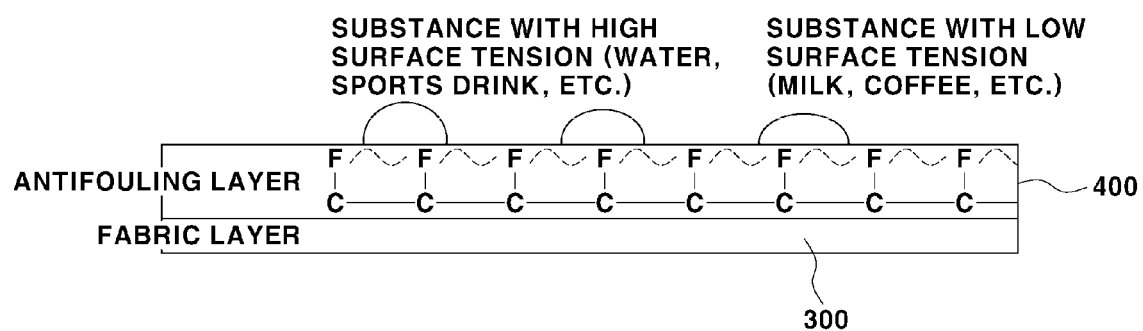
FIG. 2 illustrates the configuration of an antifouling layer placed on an upper surface of a fabric layer, according to one form of the present disclosure.
Figure 3:
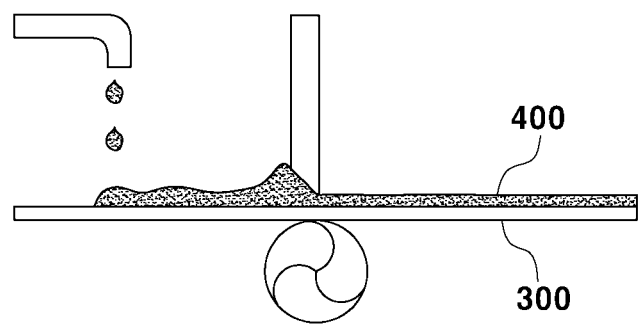
FIG. 3 illustrates a method of manufacturing an antifouling layer, according to one form of the present disclosure.

FIG. 2 shows a side sectional view of the vehicle interior material on which the first antifouling layer 400 is formed, and FIG. 3 shows a manufacturing method for forming the silicone antifouling layer of the first antifouling layer 400 on the fabric layer 300.

As shown in the drawings, in the form of the present disclosure, at least one layer of the first antifouling layer 400 is placed on the upper surface of the fabric layer 300, thus preventing contaminants from entering the fabric layer 300.

The first antifouling layer 400 is placed on the upper surface of the fabric layer 300 via the silicone resin. Thus, the first antifouling layer 400 may be formed by spraying liquid silicone onto the fabric layer 300.

Moreover, as shown in FIG. 2, in one form of the present disclosure, the first antifouling layer 400 may be configured to form the fluoro-carbon-based antifouling layer. The silicone antifouling layer may be further stacked on the upper surface of the fluoro-carbon-based antifouling layer using a knife coating method shown in FIG. 3.

FIG. 3 shows another form of the present disclosure, in which the silicone resin is stacked on the fabric layer 300 using the knife coating method.

The knife coating method is a method of applying the coating resin using a knife or a blade. The coating thickness is adjusted by a distance between the knife and a base.

In one form, the first antifouling layer 400 of the present disclosure is formed by a knife over roll method. The amount of silicone coating resin is adjusted by a distance between a roller and the knife.

Generally, the knife coating method may be mainly used when the viscosity of the silicone coating resin is 10,000 cps or more.

Moreover, the first antifouling layer 400 of the silicone material may be formed using the knife coating method. The first antifouling layer 400 placed on the upper surface of the fabric layer 300 may be formed to have the thickness of 0.05 to 0.1 mm.

In another form, the fabric layer 300 of the present disclosure may be formed to have the thickness of 0.5 to 0.8 mm. Thus, the thickness of the first antifouling layer 400 and the fabric layer 300 may be up to 1 mm or less.

In brief, the form of the present disclosure provides the interior material of the vehicle, which includes the fabric layer 300 made of the high elongation tricoat fabric among the knitted fabric, and the first antifouling layer 400 formed of the silicone material to improve the antifouling performance of the fabric layer 300, thus having excellent antifouling performance while guaranteeing a fabric texture.

Although the present disclosure was described with reference to specific forms shown in the drawings, it is apparent to those skilled in the art that the present disclosure may be changed and modified in various ways without departing from the scope of the present disclosure.

What is claimed is:

1. An interior material of a vehicle, the interior material comprising:
   a fabric layer forming the interior material of the vehicle;
   a foam layer disposed on a lower surface of the fabric layer; and
   a first antifouling layer disposed on an upper surface of the fabric layer,
   wherein the fabric layer comprises a weave or a knit of a polyurethane yarn, a high-elongation polyester yarn, and a polyester yarn,
   wherein the fabric layer has a tensile elongation of 150% or more in at least one direction of a vertical or a horizontal direction.

2. The interior material of claim 1, wherein the fabric layer comprises a knitted fabric.

3. The interior material of claim 2, wherein the knitted fabric is a tricot fabric.

4. The interior material of claim 3, wherein the tricot fabric comprises a tensile elongation of 150% or more in the vertical direction and the horizontal direction.

5. The interior material of claim 3, wherein the fabric layer contains 20 to 30 wt % of the polyurethane yarn.

6. The interior material of claim 1, wherein the fabric layer contains 50 to 60 wt % of the high-elongation polyester yarn.

7. The interior material of claim 1, wherein the fabric layer contains 20 to 25 wt % of the polyester yarn.

8. The interior material of claim 3, wherein the tricot fabric comprises:
   20 to 30 wt % of the polyurethane yarn;
   50 to 60 wt % of the high-elongation polyester yarn; and
   20 to 25 wt % of the polyester yarn.

9. The interior material of claim 1, wherein the first antifouling layer comprises a silicone antifouling layer, a fluorine-carbide-based antifouling layer, a thermoplastic polyurethane resin (TPU) film, or a combination thereof.

10. The interior material of claim 1, further comprising:
    a second antifouling layer disposed between the fabric layer and the foam layer.

11. The interior material of claim 10, wherein the second antifouling layer comprises an adhesive layer, a thermoplastic polyurethane resin (TPU) film, a hot-melt adhesive, or a combination thereof.

12. The interior material of claim 10, wherein the second antifouling layer comprises a hot-melt adhesive, a thermoplastic polyurethane resin (TPU) film, or a combination thereof.

13. The interior material of claim 1, further comprising a hard core layer formed of a plastic material, the foam layer positioned between the fabric layer and the core layer.

14. The interior material of claim 1, further comprising:
    a tear hole disposed along a tear line on the fabric layer.

15. The interior material of claim 14, wherein the tear line is at a position corresponding to a deployment position where an airbag door is configured to be deployed.

* * * * *